INVENTOR.
MURRAY A. RUBEN
BY
ATTORNEY

June 23, 1970    M. A. RUBEN    3,517,294
BATTERY CHARGER

Filed April 11, 1967    3 Sheets-Sheet 2

INVENTOR.
MURRAY A. RUBEN
BY
*Nicholas A. Pandiscio*
ATTORNEY

INVENTOR.
MURRAY A. RUBEN

United States Patent Office 3,517,294
Patented June 23, 1970

3,517,294
BATTERY CHARGER
Murray A. Ruben, Belmont, Mass., assignor to Tyco Laboratories, Inc., Waltham, Mass., a corporation of Massachusetts
Continuation-in-part of application Ser. No. 525,054, Feb. 4, 1966. This application Apr. 11, 1967, Ser. No. 635,638
Int. Cl. H02j 7/04
U.S. Cl. 320—24                                29 Claims

ABSTRACT OF THE DISCLOSURE

The specification describes a battery charger comprising a fast charge circuit adapted to supply a battery with a high charging rate current and a trickle charge circuit to supply the battery with a low charging rate current. The fast charge circuit embodies a controlled rectifier that delivers large charging current pulses to the battery and undergoes phase and frequency control according to the state of charge of the battery. The trickle charge circuit also undergoes phase control and delivers current according to the requirements of the battery.

---

This application is a continuation-in-part of my co-pending application, Ser. No. 525,054, filed Feb. 4, 1966, for Battery Charger.

The invention relates to battery chargers and more particularly to new plural mode battery chargers.

It is conventional in battery chargers to provide two modes of operation, one mode yielding a high rate of charging and the second mode yielding a low rate of charging. The first mode is employed to bring the battery up to full or near-full charge; the second mode, commonly called "trickle charging," is employed to maintain the battery at full charge and also to bring it up to full charge if the first anode is terminated short of full charge. Conventional dual mode battery chargers generally are of two types. One type employs electromechanical voltage relays which present a number of problems such as inherent relay hysteresis characterized by a relatively wide range between pick-up and drop-out, contact sticking and burning, sensitivity to change in ambient temperature, the need for adjustment due to wear, and excessive size. Another type involves a high rate charging circuit embodying a silicon controlled rectifier as a high current switch, means responsive to the difference between the battery potential and a fixed reference potential for producing a gating signal effective to block the controlled rectifier so as to open the high rate charging circuit when the battery has reached a certain level of charge, and means providing a trickle charging circuit during the interval that the controlled rectifier is blocking in the forward direction. While this second type offers several advantages stemming from the use of a controlled rectifier, it has several limitations. First of all it requires a separate rectifier circuit for producing the fixed reference voltage from the A.C. input and a voltage comparing circuit for comparing the fixed reference voltage and the battery potential. These circuits entail additional components and increase the overall size of the system. Secondly the reference potential must be sufficiently stable and the voltage comparing circuit must be sufficiently precise to permit accurate sensing of relatively small changes in battery potential. Otherwise the system may switch to the trickle charge mode before the battery is fully charged or, as sometimes happens, will unduly delay switching to the trickle charge mode after the battery has been fully charged, in which case battery damage may result from overcharging.

The general object of this invention is to provide a new method and means for charging batteries.

A further object of the invention is to provide an improved dual mode battery charger that is free of the above-recited limitations of prior battery chargers. This new battery charger is adapted to operate in a fast charge mode until the battery is fully charged, then automatically shifts to a trickle charge mode which is maintained so long as the battery potential remains above a predetermined lower level, and thereafter automatically switches back to the fast charge mode if the battery potential drops below the predetermined lower level.

A more specific object of the invention is to provide a dual mode battery charger incorporating a controlled rectifier in its fast charge circuit but not involving the use of a rectifier circuit for establishing a fixed reference potential or a voltage comparison circuit for comparing the fixed reference potential with the battery potential.

In connection with this invention it is appreciated that if a battery is not fully charged a small increment of of charging current averaging about 10 milliamps will have a small effect on battery potential; on the other hand, at close to full charge the same increment of current will cause a substantial change on battery potential. It also is appreciated that it is possible to overshoot the full charge potential of the battery by a small amount, e.g., less than 0.5 volt, with small increments of current and that no permanent battery damage will result if immediately after the battery potential exceeds its full charge level, the charging current is reduced to a rate which will allow the battery to lose its overcharge due to loading or electrochemical action. Accordingly it is a further object of the invention to provide a battery charger that charges a battery according to a first fast charge mode to a potential slightly above its full charge value, with the average charging current automatically dropping as the battery potential rises, then stops charging for a limited period while the battery potential drifts to a lower level, and thereafter commences charging according to a trickle current mode designed to stabilize the battery at or near its full charge level or resumes charging according to its fast charge mode if the trickle current mode fails to stabilize the battery potential.

A further object of the invention is to provide a battery charger characterized by a dynamic overpotential action that renders it sensitive to the state of charge of a battery immediately following each charging current pulse.

Still another object of the invention is to provide a new and improved battery charger for maintaining fully charged batteries embodied in emergency stand-by equipment, such as emergency lighting systems. Accordingly battery chargers embodying the present invention include output terminals connected between the charged battery and a load such as an emergency lamp, and switching means for preventing current flow from the battery to the load except in the event of input power failure. For the purposes of this invention "input power failure" is defined in terms of a minimum allowable input line voltage.

In accordance with an illustrative embodiment, the invention comprises a charging source of varying direct current potential and positive and negative charging terminals adapted to be connected to the corresponding terminals of a battery. Connected between the charging source and the charging terminals is a controlled rectifier which provide a fast charge circuit and a transistor which provides a trickle charge circuit, both arranged to conduct in the forward direction when the input D.C. potential exceeds the battery potential. A gating signal circuit is provided which produces a gating signal for controlling the phase angle at which the controlled rectifier fires. The gating signal circuit is adapted to cause the control rectifier to fire early in the cycle of each successive input pulse until the battery potential commences to exceed its full charge level, then causes progressively greater delays in the firing of the controlled rectifier with each input pulse and finally renders it non-conductive when the battery potential has reached a predetermined maximum level. Operation of the gating signal circuit is controlled by a feedback network connected between the positive charging terminal and the gate of the controlled rectifier, with operation of the feedback network in turn determined by reference to the battery potential. The feedback network comprises a Zener diode that conducts when the battery reaches a first potential above its full charge level and stops conducting when the battery drops to a second potential below its full charge level. The trickle charge transistor is adapted to provide a trickle charge to the battery when the battery potential is below a predetermined limit, the rate of charge applied by the trickle current transistor varying according to the state of charge of the battery. The illustrative embodiment also includes terminals for coupling battery power to a selected load such as a lamp and switching means for preventing flow of current to the load from the battery until an input power failure occurs.

The foregoing brief description as well as other objects, features and advantages of the present invention will be more fully appreciated by reference to the following detailed description of the invention which is to be considered with the accompanying drawings wherein:

FIG. 1 is a schematic diagram of a preferred embodiment constituting a combination battery charger and battery powered emergency lighting system;

FIG. 2 diagrammatically illustrates operation of the system of FIG. 1;

Figure 1:
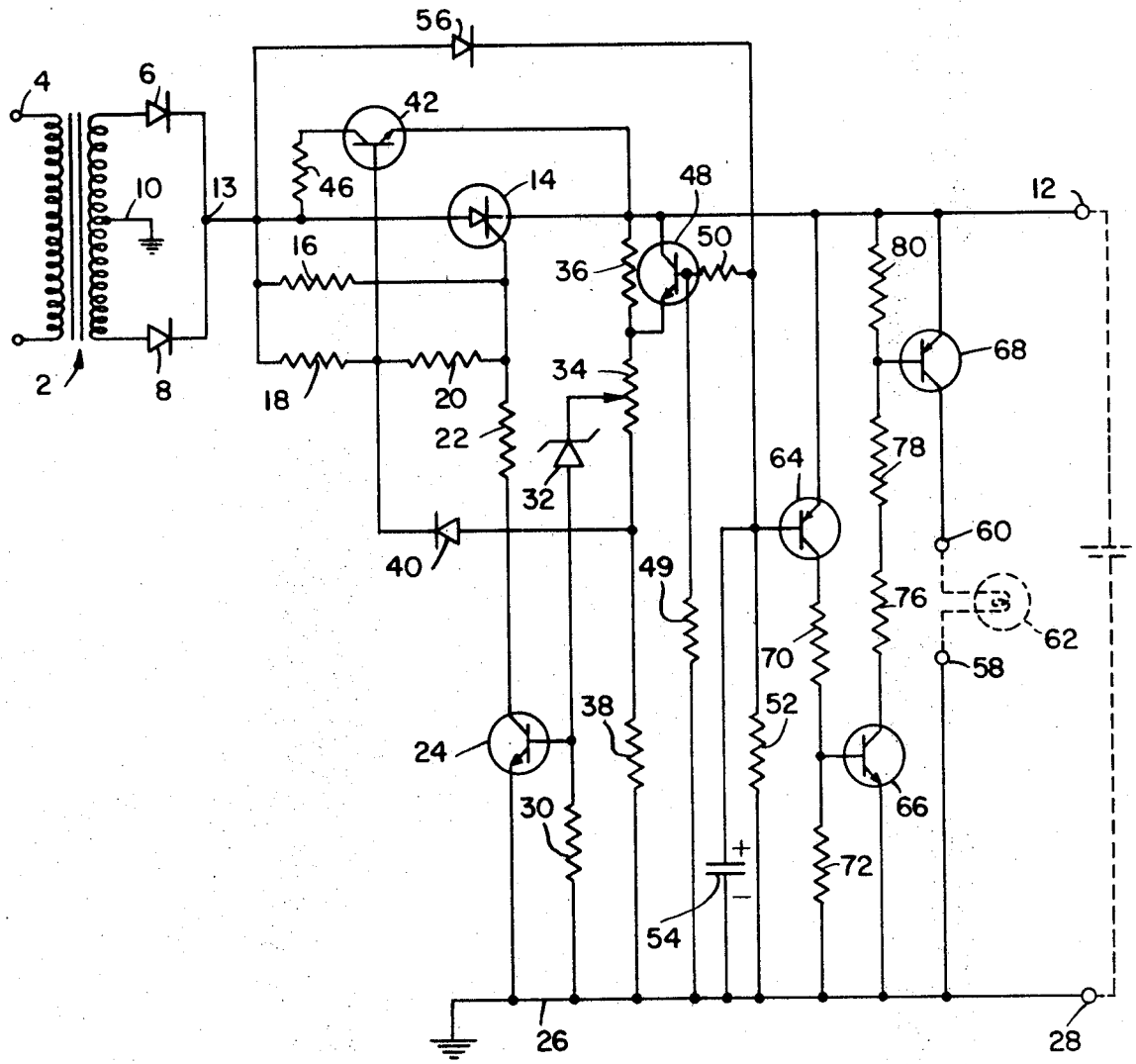

Turning now to FIG. 1 of the drawing, the preferred embodiment of the invention comprises a charging source of varying direct current potential in the form of a full wave rectifier. The rectifier comprises an input transformer 2 whose primary coil is provided with terminals 4 adapted to be connected to a 110 volt source of alternating current. The secondary coil delivers a nominal output of 15 volts. The secondary coil of transformer 2 is connected in series with two diodes 6 and 8. A center tap 10 connects the secondary coil to ground. A terminal 13 at the junction of diodes 6 and 8 is connected to a positive battery charging terminal 12 through a silicon control rectifier 14 which in the instant case is a type MCR1305–1 silicon control rectifier. The anode of rectifier 14 is connected to the rectifier circuit and its cathode is connected to the positive battery charging terminal 12. The gate of rectifier 14 is connected back to the rectifier via a 56 ohm resistor 16. Resistor 16 is part of a voltage divider network which also comprises three series connected resistors 18, 20, and 22. Resistors 18 and 20 have values of 68 ohms and 39 ohms respectively and are connected in parallel with resistor 16. Resistor 22 is a 33 ohm resistor connected at one end to gate 14 and at the other end to the collector of a transistor 24. The latter is a 2N3567 type transistor. Its emitter is connected to a common lead 26 that is connected to ground and also to a negative battery charging terminal 28. The base of transistor 24 is connected to the common lead 26 through a 270 ohm resistor 30. The base transistor 24 also is connected to the cathode of a Zener diode 32 whose anode is connected to the moveable contact of a potentiometer 34 that comprises a 100 ohm resistor that is wiped by the moveable contact. The resistor of potentiometer 34 forms part of a voltage divider network that also comprises a 56 ohm resistor 36 and a 270 ohm resistor 38. The potentiometer is connected between resistors 36 and 38 with the opposite end of resistor 36 connected to the positive battery charging terminal 12 and the opposite end of resistor 38 connected to common lead 26. The junction of potentiometer 34 and resistor 38 is connected to the anode of a diode 40. The latter is a type 1N270-diode and it has its cathode connected to the junction of resistors 18 and 20. This junction also is connected to the base of a transistor 42. The latter is a type 2N3567-transistor. The collector of this transistor 42 is connected to the anode of control rectifier 14 by way of a 6.8 ohm resistor 46. The emitter of transistor 42 is connected to the positive battery charging terminal 12.

The junction of resistor 36 and potentiometer 34 is connected to the emitter of transistor 48. The latter is a type 2N3567 transistor. The collector of transistor 48 is connected to the positive battery charging terminal 12. The base of transistor 48 is connected to common lead 26 by way of a 3.9 kilohm resistor 49 and also by way of a pair of series resistors 50 and 52. The latter resistors have values of 330 ohms and 1.8 kilohm respectively. A 150 microfarad, 15 volt capacitor 54 is connected across resistor 52. The junction of resistors 50 and 52 is connected to the junction of diodes 6 and 8 of the input rectifier by a diode 56. This diode is a type 1N4001 diode and it has its anode connected to the input rectifier and its cathode connected to the junction of resistors 50 and 52.

To the extent just described, the circuit comprises a dual mode battery charger for a battery connected between the charging terminals 12 and 28. In addition the circuit includes a pair of terminals 58 and 60 which are adapted to be connected to a suitable load, such as in incandescent filament lamp 62, plus a transfer switching circuit for preventing flow of current from a battery connected at the terminals 12 and 28 to the load until a power failure occurs at the input terminals 4.

The transfer switching circuit comprises three transistors 64, 66 and 68. Transistor 64 preferably is a type 2N3638 transistor. Its emitter is connected directly to the positive charging terminal 12, while its collector is connected to the common lead 26 by way of a 180 ohm resistor 70 and a 270 ohm resistor 72. The base of transistor 64 is connected to the junction of resistors 50 and 52. Transistor 66 preferably is a type 2N3567 transistor. This transistor 66 has its emitter connected to the common lead 26 and its base connected to the junction of resistors 70 and 72. The collector of transistor 66 is connected to the positive battery charging terminal 12 by way of a series resistance network comprising a 10 ohm resistor 76, a 5.6 ohm resistor 78 and 120 ohm resistor 80. The junction of resistors 78 and 80 is connected to the base of a type 2N1557 transistor 68. The emitter of transistor 68 is connected to the positive battery charging terminals 12. Its collector is connected to the output terminal 60. The other output terminal 58 is connected directly to the common lead 26.

Operation of this preferred embodiment of the invention will now be described, first with respect to the battery switching system and then with respect to the battery charging system.

At the outset let it be assumed that the input terminals of transformer 2 are not connected to a source of alternating current, capacitor 54 is not charged, no battery is connected across terminals 12 and 28, and a lamp 62 is connected across terminals 58 and 60. When the input transformer 2 is connected to a 110 volt source of alternating current, the input rectifier will commence to generate a series of pulses of positive current, two such pulses for each cycle of A.C. input. The positive voltage appearing at terminal 13 renders the anode of control rectifier 14 positive with respect to its cathode. At the same time the voltage divider network consisting of resistors 16, 18 and 20 renders the gate of control rectifier 14 positive. As a consequence, the control rectifier 14 conducts through the network consisting of resistors 36 and 38 and potentiometer 34. Simultaneously diode 56 conducts to charge capacitor 54. The positive voltage appearing across capacitor 54 is impressed upon the base of transistor 64. This positive base voltage, coupled with the fact that the emitter of transistor 54 is insufficiently positive, prevents transistor 54 from conducting. Non-conduction of transistor 54 prevents the base of transistor 66 from becoming sufficiently positive to cause that transistor to conduct. With transistor 66 off, the base of transistor 68 is sufficiently positive to render that transistor nonconducting. Accordingly lamp 62 remains off. If now the input transformer is disconnected from the A.C. source, the circuit will return to its original state, the capacitor discharging through resistor 52.

Assume now that with the circuit in its original state, a 6 volt lead-acid battery is connected across terminals 12 and 28 and that thereafter the input transformer is connected to the A.C. source. The capacitor 54 again will charge up through diode 56. The positive potential appearing at the base of transistor 64 will prevent it from conducting notwithstanding the fact that the positive potential impressed by the battery at terminal 12 will render its emitter more positive than was initially the case. Non-conduction of transistor 64 in turn renders transistors 66 and 68 nonconductive in the manner previously described. If subsequently there should be a power failure so that no input appears at terminal 13, capacitor 54 will discharge again through resistor 52. When this occurs, transistor 64 will conduct. This in turn causes conduction of transistors 66 and 68, whereupon lamp 62 is energized by the battery connected between terminals 12 and 28.

Operation of the battery charging system will now be described in greater detail. With a battery connected between terminals 12 and 28, the control rectifier 14 will fire when the input voltage appearing at terminal 13 exceeds the battery voltage appearing at terminal 12. In the case of a completely or partially discharged battery, the rectifier 14 will fire early in each input pulse cycle. During this time the voltage across the peaking network (consisting of capacitor 54, diode 56 and resistors 50 and 52) is relatively low, about equal to the potential at terminal 12. Under these conditions the transistor 48 is substantially non-conducting and the voltage drop across resistor 36 (equal to about ½ volt during conduction of rectifier 14) prevents firing of Zener diode 32. In effect the network consisting of resistors 36 and 38 and potentiometer 34 functions to establish a first reference potential for the Zener. The exact battery potential at which the Zener will begin to conduct is established by the setting of potentiometer 34. Preferably the potentiometer is set so that the Zener will fire when the potential at terminal 12 reaches 6.85 volts. Accordingly the Zener diode 32 will remain off even when the potential at terminal 12 reaches a level of about 6.3 volts, which is the potential of a new fully charge 6 volt lead-acid battery. With Zener 32 not conducting the voltage appearing at the base of transistor 24 is insufficiently positive to cause it to conduct. Accordingly the control rectifier 14 will continue to fire early in the cycle of each pulse appearing at terminal 13, but each successive firing will occur a little later in the pulse cycle as the battery potential appearing at terminal 12 continues to increase in response to successive pulses of charging current. When the battery potential reaches the first reference potential, i.e., 6.85 volts, the Zener diode will begin to conduct. As soon as the Zener diode begins to conduct, transistor 24 begins to conduct also. At this point it is to be noted that the more transistor 24 conducts, the larger the voltage drop appearing across the network comprising resistors 16, 18 and 20, and the more negative the voltage appearing at the gate of the control rectifier. Accordingly, the rectifier will commence to fire still later in each pulse cycle.

Figure 2:
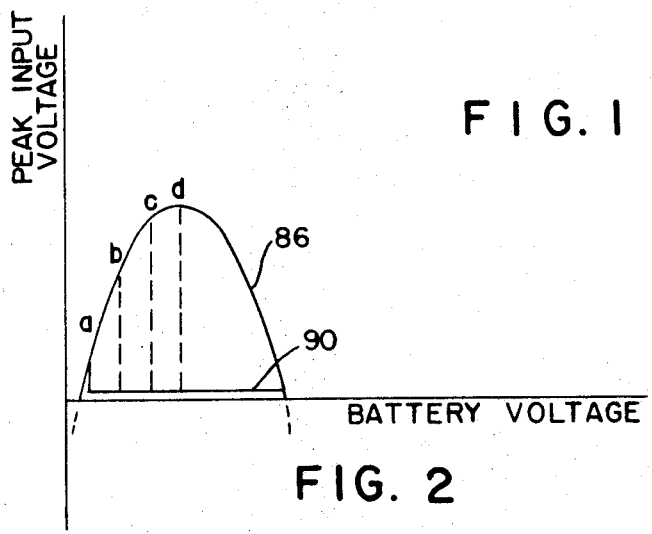

The foregoing action is illustrated by FIG. 2 where the waveform 86 represents the input voltage at terminal 13 as it peaks above the battery voltage at terminal 12 and the line 90 represents the level of the forward voltage drop of the controlled rectifier during conduction. Firing of the controlled rectifier occurs no later than point $a$ in the input voltage cycle until transistor 24 begins to conduct, and thereafter it occurs at later times such as those represented by points $b$, $c$, and $d$.

As noted earlier, conduction of diode 56 causes charging of capacitor 54. The voltage across capacitor 54 will build up slowly as the control rectifier begins to fire later in each pulse cycle. As it approaches peak voltage, it drives a base current through transistor 48 sufficient to cause the latter to conduct. When transistor 48 is switched on it effectively provides a low impedance shunt across resistor 36. This establishes a second lower reference potential for the Zener diode, causing the latter to conduct harder, which in turn makes the transistor 24 conduct harder. At the preferred setting of potentiometer 34 the second reference battery potential is about 6.52 volts. The increased conduction of transistor 24 resulting from conduction of transistor 48 in turn increases the voltage drop across the resistor network 16, 18 and 20 and causes the gate of rectifier 14 to become more negative and also causes a larger voltage to be impressed across capacitor 54. This feedback action shuts off control rectifier 14. During the time that the control rectifier is shut off by the action of transistor 24, the battery potential will drop at a rate determined by the age and state of charge of the battery.

Figure 3:
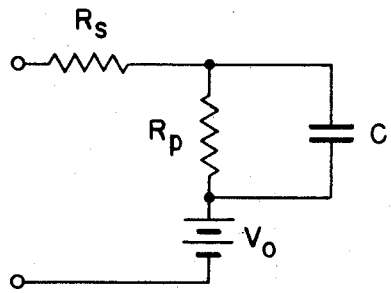
FIG. 3 is an equivalent circuit of a battery connected to the system of FIG. 1.

In this connection reference is had to FIG. 3 which is an equivalent circuit for the battery being charged. $V_o$ represents the D.C. open potential of the battery at rest (equal to about 6.3 volts for a fully charged 6 volt battery), $R_s$ is the equivalent pulse series resistance of the battery (i.e., instantaneous voltage divided by instantaneous current), $R_p$ represents the equivalent excess charge dissipation resistance, and C is battery capacitance. The time constant of the battery is the product of $R_p$ and C. If it is a good battery, its time constant will be relatively large and it will tend to behave essentially as a capacitor. Hence it will lose its excess charge at a relatively slow rate. On the other hand, if it is not a good battery its time constant will be less and it will tend to behave more like a resistor. Hence its potential will drop relatively fast (it also will receive a high charging current). The battery's potential also will tend to drop substantially if it is not fully charged. As the battery potential drops slowly toward the second reference potential, the Zener will conduct less and thus cause the control rectifier to fire at a point late in the input pulse cycle. This resulting pulse of charging current will tend to raise the battery potential again. The Zener will conduct more as the battery potential increases and thus inhibit refiring of the control rectifier until the battery potential has dropped again to refiring level. This action will be repeated at a frequency determined by the time constant of the battery. If the battery potential drops below the second reference potential, the Zener will go off. This enables the control rectifier to fire early in the input pulse cycle. The time constant of the circuit comprising resistors 52 and 50 and capacitor 54 is long enough so that if the control rectifier does not fire at an early conduction angle there will be no action to reset the circuit to the higher first reference potential and the Zener diode will continue to conduct with the potential at terminal 12 at or above 6.52 volts. On the other hand, if the control rectifier fires often enough on the average to indicate significant charging current when the Zener diode is on, then positive feedback will be initiated to re-establish the first higher reference potential. Stated another way, if the average voltage across the control rectifier does not equal the peak voltage across the capacitor for several cycles, the capacitor will discharge through resistor 52. This will cause transistor 48 to cease conduction and thus re-establish the first reference potential for Zener diode 32. With the Zener diode cut off by resetting of the first reference potential, the silicon control rectifier again will fire early in the cycle of the input pulse and will continue to do so until the potential at terminal 12 is again at the first reference level when the Zener will commence to conduct and thereby re-establish phase control over rectifier 14.

The transistor 42 provides a trickle charge circuit with the value of resistor 46 limiting the magnitude of the maximum trickle current. The voltage at the base of transistor 42 is clamped to the battery potential through base-emitter diode 40. The trickle charge transistor 42 conducts in response to an input at terminal 13 but its degree of conduction will vary with the input, the battery potential at terminal 12 and the state of control rectifier 14. In any event it will always conduct before control rectifier 14 is fired. It will conduct at a low rate when the control rectifier is on and at a higher trickle charge rate when the control rectifier is off. This difference in conduction of transistor 42 is determined by the junction drop across the rectifier 14. The operation of trickle charge transistor 42 also is affected by conduction of transistor 24. When the latter is turned on as a result of conduction of Zener 32, it produces a decrease in the voltage on the base of transistor 42, thereby foreshortening the trickle current pulse. As Zener diode 32 and transistor 24 conduct harder, transistor 42 is caused to conduct less and eventually it shuts off entirely. This latter action occurs at about the time that rectifier 14 is blocked due to conduction of transistor 24 and conduction of transistor 48. Trickle charge transistor 24 will commence conduction again when the battery potential drops to about 6.75 volts and its current output will be the only charging current applied to the battery except when the control rectifier is caused to fire again. Since the degree of conduction of trickle charge transistor tends to vary inversely with the battery potential, it tends to provide the battery with enough current to offset its corrosion current. If the battery has a relatively low corrosion current so that its potential tends to drop slowly below about 6.3 volts, the trickle circuit will provide a relatively small charging current. If the corrosion current is greater so that the battery potential drops at a faster rate, the trickle circuit will provide a correspondingly larger charging current. If for one reason or another (e.g. the battery has a relatively short time constant) the battery potential cannot be maintained fully charged by operation of trickle charge transistor 42, the control rectifier will fire to provide a fast charge current in the manner previously described.

To recapitulate, the trickle charge transistor 42 operates at a fixed frequency (the frequency of the pulses supplied by the input rectifier) but undergoes phase control as the battery potential changes, whereas the fast charge SCR 14 undergoes several modes of operation. At the outset the SCR fires at the same fixed frequency with a substantially constant pulse width. Then as transistor 24 starts to conduct, the SCR 14 continues to fire at the same frequency but undergoes phase control so that its pulse width diminishes as the battery charge improves. Subsequently it undergoes frequency control where its pulse width is fairly constant but small (it fires at about the 90° angle) and its frequency is determined by the state of charge of the battery. In this frequency control mode the SCR 14 may not fire with every input cycle and may skip one or more cycles according to the rate of decay of the battery potential after each SCR pulse which in turn depends upon the state of charge of the battery, i.e., the rate of decay becomes more gradual as the battery approaches full charge. However, the trickle charge transistor 42 will continue to conduct with each input pulse. Eventually the battery potential stabilizes at a level at which the Zener is constantly conducting hard enough that the SCR will remain off and the only current supplied to the battery is by way of trickle charge transistor 42. By way of comparison the control rectifier when operating early in the input pulse cycle provides an average charging current of about 4.0 amps whereas the trickle charge circuit provides a maximum average current of about 150 milliamps.

Figure 4:
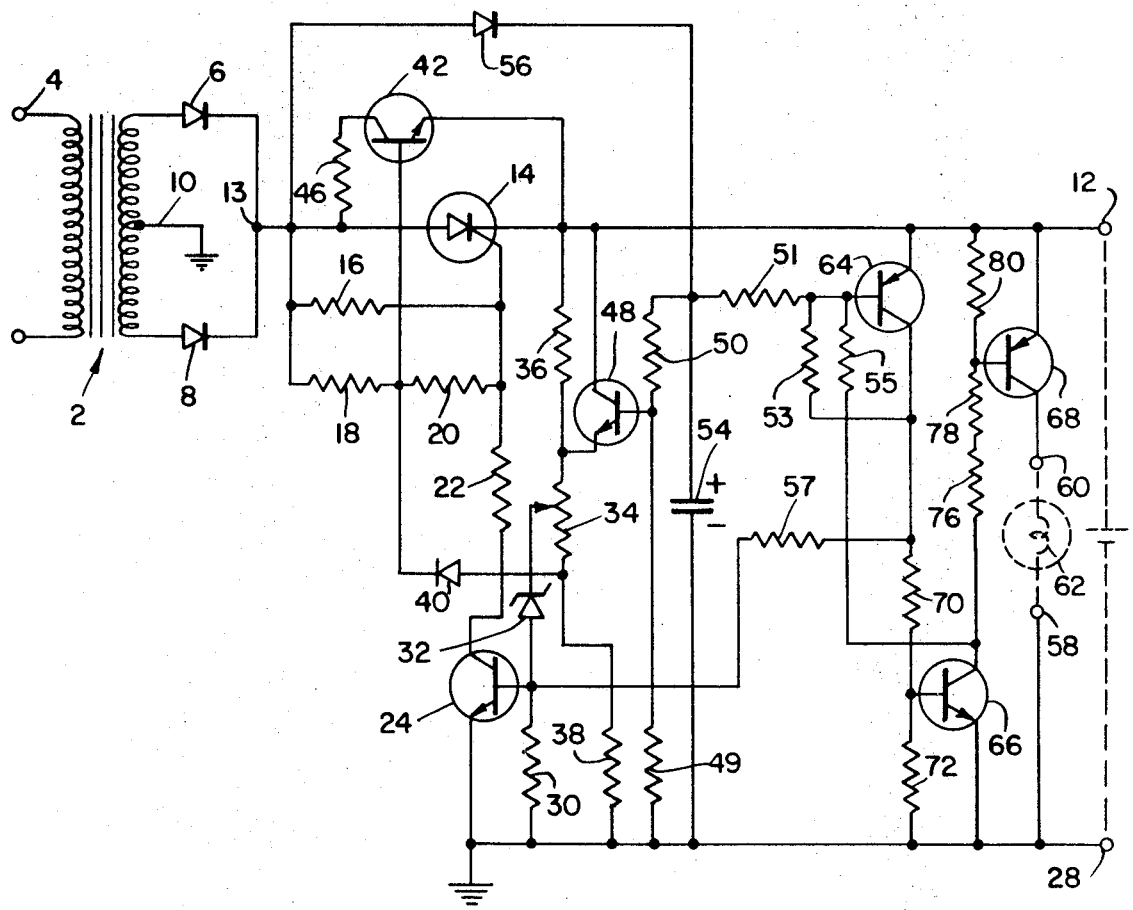
FIG. 4 is a schematic diagram of a second embodiment of the invention.

The second embodiment of the invention shown in FIG. 4 differs from the system of FIG. 1 in that it includes a different form of transfer switching circuit that is sensitive to input line voltage and is characterized by a hysteresis-type operation wherein a lower line voltage is required to switch it on than is required to switch it off. Although not fully shown, it is to be understood that the battery charger section of this embodiment is essentially the same as that of FIG. 1; thus the following description is directed primarily to the different transfer switch. This second embodiment includes all of the elements of FIG. 1 except for resistor 52 and all elements common to FIG. 1 are identified by the same numerals.

Referring now to FIG. 4, the junction of resistor 50 and capacitor 54 is connected to the base of transistor 64 by way of a 620 ohm resistor 51. The base and collector of transistor 64 are connected by a 5.1 kilohm resistor 53 and a 1.5 kilohm resistor 55 connects the base of transistor 64 and the collector of transistor 66. Another 270 ohm resistor 57 connects the collector of transistor 64 and the base of transistor 24.

Operation of the system of FIG. 4 will now be described. Assume that the charger is operating in the trickle mode and that the battery is fully charged. At this time capacitor 54 is storing the peak reflected line voltage (i.e., the voltage at terminal 13) via diode 56. With the transfer switch off (transistors 64, 66 and 68 non-conducting), the voltage at the junction of resistors 76 and 55 is highly positive (almost equal to the battery voltage at terminal 12) relative to the voltage at the junction of resistors 70 and 53. Assume now that there is an input power failure sufficient to cause conduction of transistor 64 and in turn transistor 66. It is to be noted that resistors 70 and 72 clamp transistor 66 so it will not operate merely with a line surge. When conduction of transistors 64 and 66 occurs, the voltage at the junction of resistors 76 and 55 will become less positive than the voltage at the junction of resistors 70 and 53. More specifically, as transistor 66 conducts, the collector of transistor 64 goes positive but its base goes negative at a faster rate due to action of resistor 55 which provides current at a fatser rate to the base of transistor 64 than is lost by way of resistor 53. As a result of this regenerative effect, transistors 64 and 66 will conduct fully and transistor 68 conducts when transistor 66 saturates. On cessation of input power failure, a higher input voltage is required to turn off the transfer switch than was required to turn it on. More specifically, because of the reversal of polarities of the junction of resistors 53 and 70 and the junction of resistors 55 and 76, a higher peak voltage is needed at the junction of resistors 53 and 55 (i.e., the base electrode) to trigger off transistor 64. The action again is regenerative; the base voltage of transistor 64 will go positive faster as 64 starts to conduct less. The hysteresis range of transistor 64 is determined by the relative magnitudes of resistors 53 and 55. The specific system of FIG. 4 as above described has a 10 volt hysteresis range; for this system there is an effective power failure (lower line voltage sufficient to cause the transfer switch to go on) when the line voltage drop below 85 volts and an effective power resumption (higher line voltage sufficient to cause the transfer switch to go off) when the line voltage reaches 95 volts.

In this second embodiment resistor 57 is important. Its function is to lock the controlled rectifier 14, and also trickle mode transistor 42 against possible conduction when the transfer switch is closed (note that input power failure does not mean total absence of reflected line voltage). It achieves this locking function by delivering enough current to the base of transistor 24 to drive it to saturation. With the transfer switch on but without resistor 57, capacitor 54 would not sense the reflected peak line voltage but instead would sense the voltage drop across the controlled rectifier. Hence the charge on the capacitor would not build up to a level sufficient to turn off the transfer switch.

Figure 5:
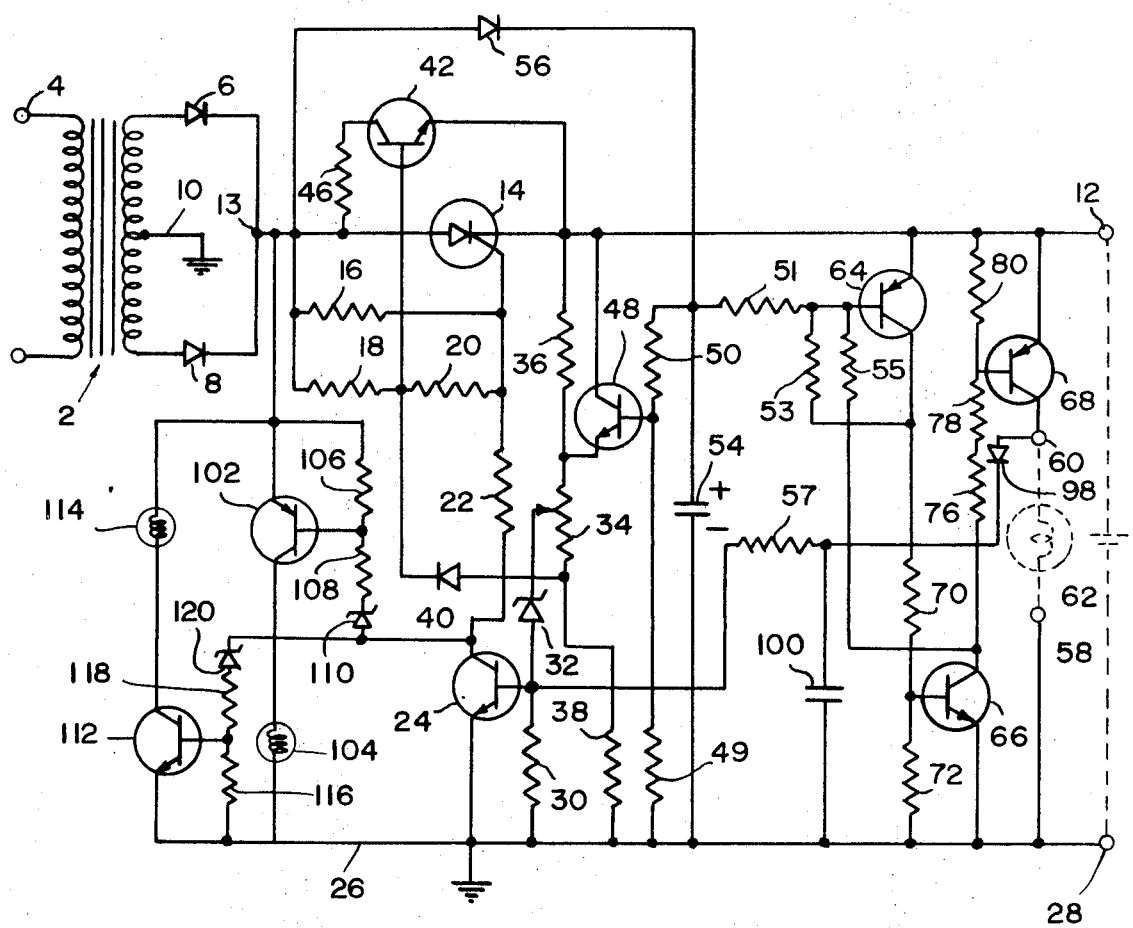
FIG. 5 is a schematic diagram of a further embodiment of the invention.

FIG. 5 illustrates a further modification of the invention. Except for the features mentioned hereafter the circuit of FIG. 5 is essentially the same as that of FIG. 4. One change involves disconnecting resistor 57 from the collector of transistor 64 and connecting it instead to the collector of transistor 68 through a diode 98, plus inserting a capacitor 100 between ground and the junction of resistor 47 and diode 98. This change provides further control over SCR 14 when the transfer switch goes off. It has been determined that at rare intervals and for a reason not readily apparent the transistor 68 may undergo a time delay in shutting down and this slow drop in conduction tends to cause premature firing of SCR 14. If transistor 68 is not completely off when SCR 14 fires, the SCR will see not only the battery load but also the load through transistor 68. The result is that the SCR will pump heavy current through transistor 68, causing transistor 68 or other components of the transfer switch to burn out. This problem is overcome by introduction of diode 98 and capacitor 100. The addition of these elements does not alter the transfer switch's sensitivity to input line voltage or its hysteresis type operation—a lower line voltage is required to switch it on than is required to switch it off. Resistor 57 still locks control rectifier 14 and trickle transistor 42 against conduction when the transfer switch is closed by delivering enough current to the base of transistor 24 to drive it to saturation. However, when the transfer switch starts to go off, the charge on capacitor 100 serves to keep transistor 24 conducting at a high rate just long enough to prevent the SCR from firing prematurely.

The circuit of FIG. 5 further includes "high charge" and "low charge" indicator circuits. The low charge indicator circuit comprises a PNP transistor 102 having its emitter connected to terminal 13 and its collector connected via a light bulb 104 to common lead 26. Its base is coupled to its emitter by a resistor 106 and to the collector of transistor 24 by way of a second resistor 108 and a Zener diode 110. The high charge indicator circuit comprises an NPN transistor 112 having its emitter connected to base lead 26 and its collector connected to terminal 13 via a second light bulb 114. The base of transistor 112 is coupled to its emitter by a resistor 116 and to the collector of transistor 24 by a resistor 118 and a Zener diode 120. The foregoing components are selected so as to provide the following modes of operation.

Assume that a discharged battery has been connected across terminals 12 and 28 and that transformer terminals 4 have been connected to a 110 volt, 60 cycle source of alternating current, so that SCR 14 is conducting heavily. Under these conditions transistor 112 will be conducting and light bulb 114 will be energized, whereas transistor 102 will be substantially nonconducting and light bulb 104 will be off. Light 114 will remain on until transistor 24 is conducting sufficiently to cause SCR 14 to shut down in the manner previously described. As transistor 24 approaches or reaches saturation it will cause Zener 120 to conduct less and this in turn will drive the base of transistor 112 to cutoff, whereupon light 114 will go out. This occurs when the battery has been brought up to about 90% of full charge. Transistor 112 will remain shut down so long as the SCR 14 does not resume operation in the high charge mode. The low charge bulb 104 does not go on until the high charge bulb 114 goes off. In most cases there is a short hiatus but under some conditions both lights may be on at the same time briefly. During the time that SCR 14 is conducting heavily and transistor 24 is non-conducting or conducting insufficiently to shut down SCR 14, the voltage at the collector of transistor 24 is too high to permit conduction of Zener 110. As a result, transistor 102 is substantially non-conducting and light 104 remains off. However, when transistor 24 begins to conduct heavily, the voltage at the collector of transistor 24 will drop enough to cause firing of Zener 110. When this occurs transistor 102 will start to conduct and light bulb 104 will go on. The intensity of this light will depend on how much time Zener 110 is on since it averages the latter's output. The intensity of the light from bulb 104 will increase with increasing battery charge and thus indicates how heavy the trickle current transistor 42 is conducting. When the latter begins to operate, its pulse width is foreshortened only to a limited extent by the feedback to its base from transistor 24 and hence it puts out about 150 ma. of current. At this time light bulb 104 is essentially off or so dim as to look off. However, as the battery potential approaches full charge, the pulse width of the output of transistor 42 is decreased as a result of the greater phase angle control produce by increased conduction of transistor 24, and the trickle current drops at about 75 ma. At this time light bulb 104 becomes bright and stays so as long as the battery potential is held steady by the trickle current supplied thereto. Bulb 104 will go out as soon as the charger returns to its high charge operating mode.

It is believed to be apparent that the systems just described involve sensing the open circuit potential of the battery in relaxation immediately following each charging current pulse and simultaneously sensing the average charging current through the controlled rectifier with the magnitude of both affecting its mode of operation. Furthermore controlled rectifier 14 is subject to both phase and frequency control and phase control is effected by means of two alternately established reference potentials for Zener 32. An additional feature is that the trickle charge circuit does not provide a constant current but instead provides current according to the requirements of the battery.

An important advantage of the invention is that it compensates for variations in input line voltage. The lower reference potential established by conduction of transistor 48 is not disturbed by nominal variations in line voltage; line voltage changes of ± about .15 volts do not affect transistor 48. On the other hand, the higher overshoot reference potential established by non-conduction of transistor 48 tends to decrease with an increase in line voltage. Resistor 49 contributes to the reliability of operation of the overshoot circuit, lowering the base voltage of transistor 48 enough to maintain the latter nonconducting in the event of a high line voltage drop.

Another incidental advantage resides in the fact that the Zener diode 32 has a negative temperature coefficient. This goes in hand with the negative temperature coefficient of the battery gassing potential. If the battery is warm, its potential will be lower for the same current input as it would be at a lower temperature. In a hot environment the overshoot circuit comprising transistor 48 undergoes an increase in gain so that it also will shut off sooner. In other words, the reference potential established through operation of the Zener diode will be lower, in keeping with the fact that the battery overshoot required to achieve full charging is lower in a hot environment.

It is to be understood that the invention is not limited in its application to the details of construction and arrangement of parts specifically described or illustrated. Thus, for example, it is possible to modify the transfer switch by omitting transistor 68 and replacing it with a relay comprising an operating coil that would be inserted in series with or in place of resistor 80 and a pair of normally open contacts that would be connected in series with terminals 58 and 60. Accordingly, the invention may be

I claim:

1. Apparatus comprising an input transformer, means connected to the secondary of said transformer providing a charging source of varying direct current potential in response to an alternating current input to said transformer, positive and negative charging terminals adapted to be connected to the corresponding terminals of a battery, a controlled rectifier having a cathode, anode and gate, means connecting said anode to the positive side of said charging source, means connecting said cathode to said positive charging terminal, means connecting the negative side of said charging source to said negative charging terminal, means providing a positive gating signal at said gate so that said controlled rectifier will conduct in the forward direction when said direct current potential exceeds the potential of said battery, said controlled rectifier when conducting in the forward direction providing a high charging rate current to said battery, means connected between said charging source and said charging terminals providing a trickle charging circuit when said controlled recitfier is blocking, first means operative after said battery potential has reached a first predetermined level for progressively rendering said gating signal less positive in response to increasing battery potential with said gating signal becoming sufficiently less positive to block said controlled rectifier, and second means for maintaining said first means operative so long as said battery potential does not drop below a second lower predetermined level.

2. Apparatus as defined by claim 1 further including output terminal means adapted to be connected to a load, switching means connected between said output terminal means and said battery charging terminals, and means normally holding said switching means open and operative on failure of said charging source to close said switching means so that current may flow to said load from a battery coupled to said charging terminals.

3. A battery charger comprising means providing a charging source of direct current potential, positive and negative charging terminals adapted to be connected to the corresponding terminals of a battery, a controlled rectifier having a cathode, anode and gate, means connecting said anode to the positive side of said charging source, means connecting said cathode to said positive charging terminal, means connecting the negative side of said charging source to said negative charging terminal, means providing a positive gating signal at said gate so that said controlled rectifier will conduct in the forward direction when said direct current potential exceeds the potential of said battery, said controlled rectifier when conducting in the forward direction providing a charging current to said battery, first means operative after said battery potential has reached a first predetermined level for progressively rendering said gating signal less positive in response to increasing battery potential with said gating signal becoming sufficiently less positive to block said controlled rectifier, and second means for maintaining said first means operative so long as said battery potential does not drop below a second lower predetermined level.

4. A battery charger as defined by claim 3 wherein said first means is responsive to said battery potential.

5. A battery charger as defined by claim 3 wherein said means providing a positive gating signal at said gate includes a resistance network connected between said anode and said gate, and further wherein said first means comprises a normally non-conducting variable current device connected to said resistance network and means operative after said battery potential has reached said first level for causing said variable current device to conduct at a rate varying with said battery potential.

6. A battery charger as defined by claim 5 wherein said last-mentioned means comprises a Zener diode connected between said variable current device and said positive charging terminal.

7. A battery charger as defined by claim 6 wherein said Zener diode is connected to said positive charging terminal by way of a voltage-dropping resistor, and further wherein said second means comprises means for shunting said resistor with a low impedance current path after said battery potential has reached said first level and for maintaining said low impedance current path so long as said battery potential does not drop below said second level.

8. A battery charger as defined by claim 7 wherein said means for shunting said resistor comprises a variable current device.

9. A battery charger as defined by claim 8 further including a capacitor, means connecting one side of said capacitor to said negative charging terminal, unidirectional current-conducting means connecting the other side of said capacitor to the positive side of said charging source so that said capacitor can charge in response to said charging potential, and means connected between said capacitor and said variable current device for enabling conduction of said device when the charge stored by said capacitor reaches a predetermined level.

10. A battery charger comprising an input rectifier providing a source of pulsating direct current potential in response to an input of alternating current, positive and negative charging terminals adapted to be connected to the corresponding terminals of a battery, a controlled rectifier with its anode connected to one side of said source and its cathode connected to said positive charging terminal, means connecting the other side of said source to said negative charging terminal, said controlled rectifier when conducting in the forward direction providing a high rate charging circuit for a battery connected to said charging terminals, means for producing a positive signal at the gate of said controlled rectifier so as to cause it to conduct when its anode is positive with respect to its cathode, first means operative after the battery potential at said positive charging terminal has risen to a first overcharged level to render said gate signal less positive with each succeeding pulse of direct current potential applied to its anode and render said gate signal sufficiently less positive to block said controlled rectifier, second means for maintaining operation of said first means so long as the potential at said positive charging terminal is between said first overcharge level and a second lower level and for terminating operation of said first means when the battery potential at said positive charging terminal falls substantially below said second lower lever, and means providing a trickle charge circuit between said source and said charging terminals for charging said battery at a low rate when said controlled rectifier is blocked.

11. A battery charger as defined by claim 10 wherein said trickle charge circuit comprises a transistor and means for varying the conduction of said transistor as a function of the battery potential.

12. A battery charger as defined by claim 10 wherein said trickle charge circuit comprises a transistor connected across said controlled rectifier.

13. A battery charger as defined by claim 12 further including means connected to said first means for rendering said transistor non-conductive substantially simultaneously with blocking of said controlled rectifier by said first means.

14. A battery charger as defined by claim 13 further including means responsive to the battery potential at said positive charging terminal for rendering said transistor conductive when the battery potential drops below said first overcharge level and for varying the conduction of said transistor as a function of said battery potential.

15. A battery charger comprising means including a controlled rectifier for delivering a series of current pulses to a battery, means for sensing the open circuit potential of the battery in relaxation immediately following each charging current pulse, means responsive to and controlled by said sensing means for controlling conduction of said controlled rectifier so that the average current of said series of pulses is adjusted in accordance with the rate at which said open circuit potential tends to drop in the interval between successive pulses, means for delivering a second series of current pulses to the same battery, the pulses of said second series being substantially smaller in amplitude than the pulses of said first-mentioned series, and means for reducing the width of said substantially smaller amplitude pulses in accordance with the rate at which said open circuit potential tends to drop in the interval between successive pulses.

16. A battery charger comprising a charging source of varying direct current potential, a charging current circuit connected to said source of varying direct current potential having output terminals adapted to be connected to the terminals of a battery to be charged, said charging current circuit including a controlled rectifier for passing current pulses from said source to said output terminals, means for biasing said controlled rectifier so that it will conduct to deliver pulses of current from said source to said output terminals, means for sensing in the interval between successive current pulses the open circuit potential of a battery coupled across said output terminals, means responsive to said sensing means for adjusting the bias on said rectifier so as to vary the time interval during which said rectifier is in its conductive state according to the rate at which said open circuit potential tends to drop in the interval between successive pulses, a trickle charge circuit adapted to pass relatively small amplitude current pulses from said source to a battery connected between said output terminals, and means responsive to said sensing means for varying the width of said small amplitude pulses according to the rate at which said open circuit potential tends to drop between successive pulses.

17. A battery charger as defined by claim 16 wherein said small amplitude pulses occur at a fixed repetition rate.

18. A battery charger as defined by claim 16 wherein said small amplitude pulses occur in phase with the pulses passed by said controlled rectifier.

19. A battery charger comprising a charging source of varying direct current potential, a charging current circuit connected to said source of varying direct current potential having output terminals adapted to be connected to the terminals of a battery to be charged, said charging current circuit including a controlled rectifier for passing current pulses from said source to said output terminals, means for biasing said controlled rectifier so that it will conduct to deliver pulses of current from said source to said output terminals, means for sensing in the interval between successive current pulses the open circuit potential of a battery coupled across said output terminals, means responsive to said sensing means for adjusting the bias on said rectifier so as to vary the time interval during which said rectifier is in its conductive state according to the rate at which said open circuit potential tends to drop in the interval between successive pulses, an energizeable load and normally open switching means connected in series between said output terminals, and means for closing said switching means so that current may flow to said load from a battery coupled to said output terminals when the potential at said source falls below a first level and for reopening said switching means if said potential rises again to a second predetermined level above said first level.

20. Apparatus as defined by claim 19 further including means for preventing closing of said switching means as a result of a temporary surge in the potential at said source.

21. Apparatus as defined by claim 16 further including means for indicating when said controlled rectifier is providing current pulses to said battery at a high repetition rate.

22. Apparatus as defined by claim 16 further including means for indicating when said controlled rectifier is blocking and said trickle charge circuit is operative.

23. Apparatus as defined by claim 16 further including first means for indicating when said controlled rectifier is providing current pulses to said battery at a predetermined repetition rate, second means for indicating when said controlled rectifier is blocking and said trickle charge circuit is operative, means for deactivating said first means when said controlled rectifier changes from conducting to blocking, and means for preventing activating of said second means while said controlled rectifier is conducting at said predetermined repetition rate.

24. A battery charger comprising input terminals adapted to be connected to a source of electrical potential, output terminals adapted to be connected to a battery to be charged, first means operative when said input terminals are connected to said source and said output terminals are connected to said battery to deliver to said battery a series of current pulses of predetermined width and repetition rate, second means for alternatively establishing a first higher reference level and a second lower reference level for the potential of said battery in the interval between successive pulses, said second means normally establishing said first reference level when said battery is in a state of discharge, third means for sensing the potential of said battery in the interval between successive pulses with respect to the established reference level, fourth means responsive to the potential of said battery between pulses operative when said battery potential reaches a predetermined value to cause said second means to establish said second reference level so that said sensing means senses the potential of said battery between successive pulses with respect to said second reference level, and fifth means responsive to said sensing means for decreasing the width of said pulses in accordance with a decrease in the rate at which said battery potential tends to drop between successive current pulses while said first reference level is established and for further decreasing said pulse width and thereafter decreasing said repetition rate in accordance with further decreases in said rate while said second reference level is established.

25. A battery charger comprising an input transformer, means connected to the secondary of said transformer providing a charging source of varying direct current potential in response to an alternating current input to said transformer, positive and negative output terminals adapted to be connected to the terminals of a battery to be charged, means providing a charging current circuit between said charging source and said output terminals, said charging current circuit including a controlled rectifier adapted when conducting to pass current pulses from said charging source to said output terminals, said controlled rectifier having its anode connected to said charging source and its cathode connected to said positive output terminal, means connected between the anode and gate of said controlled rectifier for providing a gating signal at the gate of said controlled rectifier that varies in phase with the potential at said anode so that said controlled rectifier will conduct when the potential at said anode exceeds the potential at said cathode, and means responsive to the potential of said battery for varying said gating signal in accordance with the rate at which the open circuit potential of a battery connected across said output terminals tends to drop in the interval between successive current pulses so that the average current of said series of pulses varies as a function of said rate.

26. A battery charger comprising means for providing a source of varying direct current potential in response to an input of alternating current, positive and negative charging terminals adapted to be connected to the corresponding terminals of a battery, a controlled rectifier with its anode connected to one side of said source and its cathode connected to said positive charging terminal, means connecting the other side of said source to said negative charging terminal, means connected between said anode and the gate of said controlled rectifier for producing in response to said varying direct current potential a positive gating signal at said gate so as to cause said controlled rectifier to conduct in the forward direction and supply a charging current to a battery connected between said charging terminals when said anode is positive with respect to said cathode, means connected between said positive and negative charging terminals for sensing the open circuit potential of a battery connected between said charging terminals when said controlled rectifier is not conducting, and means connected to said gate and responsive to said sensing means for rendering said gating signal less positive with increasing open circuit potential.

27. A battery charger as defined by claim 26 wherein said means for producing a positive gating signal at said gate includes a fixed resistance network connected between said anode and said gate, and further wherein said last-mentioned means comprises a variable current device connected to said resistance network and means connecting said variable current device to said sensing means so that said variable current device will conduct at a rate varying with said open circuit battery potential.

28. A battery charger as defined by claim 27 wherein said variable current device is a transistor having its emitter and collector connected between said fixed resistance network and ground, and further wherein said sensing means comprises a Zener diode connected between the base of said transistor and said positive charging terminal.

29. A battery charger comprising an input transformer with a primary winding and secondary winding, a rectifier circuit including a grounded center tap for said secondary winding and rectifier means connected in series with said secondary winding producing a periodically varying positive direct current potential in response to an alternating current input to said primary winding, first and second output terminals for connection to the positive and negative terminals respectively of a battery to be charged, circuit means providing a path for charging current pulses between said rectifier circuit and said output terminals, said circuit means including a ground connection for said second output terminal and a controlled rectifier having its anode connected to said rectifier means and its cathode connected to said first output terminal, first means connected between the anode and gate of said controlled rectifier for producing at said gate a positive gating signal whose amplitude varies in phase with the amplitude of the direct current potential at said anode so that said controlled rectifier will conduct in the forward direction to deliver current to a battery connected across said output terminals when anode is positive with respect to said cathode, second means including means connected across said output terminals for sensing in the interval between successive current pulses the open circuit potential of the battery coupled across said output terminals, and third means comprising a variable current device responsive to said second means and connected to said first means for rendering said gating signal less positive in response to increasing open circuit potential of said battery so that the phase angle at which said controlled rectifier is rendered conductive by said gating signal is influenced by the rate at which said open circuit potential tends to drop in the interval between successive current pulses.

References Cited

UNITED STATES PATENTS

| | | | |
|---|---|---|---|
| 3,018,432 | 1/1962 | Palmer | 320—39 X |
| 3,300,704 | 1/1967 | McMillen | 320—61 |
| 3,305,755 | 2/1967 | Walsh | 320—40 |
| 3,363,162 | 1/1968 | Bawden | 320—27 |
| 3,408,559 | 10/1968 | Bambace et al. | 323—22 |
| 3,159,755 | 12/1964 | Duncan | 320—4 X |
| 3,412,308 | 11/1968 | Brown | 320—24 |

J D MILLER, Primary Examiner

J. M. GUNTHER, Assistant Examiner

U.S. Cl. X.R.

320—39, 43; 321—18; 323—23

UNITED STATES PATENT OFFICE
CERTIFICATE OF CORRECTION

Patent No. 3,517,294 June 23, 1970

Murray A. Ruben

It is certified that error appears in the above identified patent and that said Letters Patent are hereby corrected as shown below:

Column 1, line 38, "anode" should read -- mode --.

Signed and sealed this 16th day of February 1971.

(SEAL)
Attest:

Edward M. Fletcher, Jr.
Attesting Officer

WILLIAM E. SCHUYLER, JR.
Commissioner of Patents